A. SWENSON.
APPARATUS FOR DIGGING HOLES FOR POSTS, &c.
APPLICATION FILED FEB. 27, 1911.
995,496.
Patented June 20, 1911.
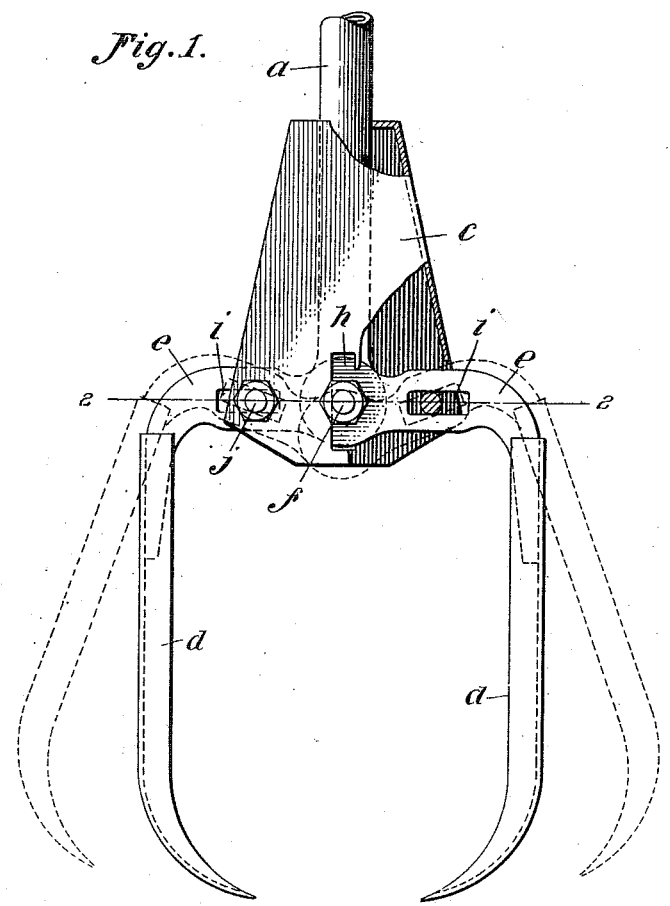
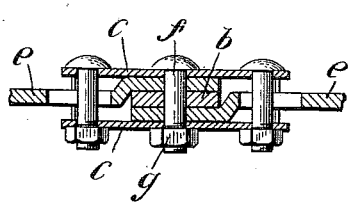

UNITED STATES PATENT OFFICE.

ALBERT SWENSON, OF DULUTH, MINNESOTA.

APPARATUS FOR DIGGING HOLES FOR POSTS, &c.

995,496.  Specification of Letters Patent.  Patented June 20, 1911.

Application filed February 27, 1911. Serial No. 611,091.

*To all whom it may concern:*

Be it known that I, ALBERT SWENSON, a citizen of the United States, and a resident of Duluth, county of St. Louis, and State of Minnesota, have invented certain new and useful Improvements in Apparatus for Digging Holes for Posts, &c., of which the following is a full and clear specification, reference being had to the accompanying drawings, in which—

Figure 1 is a side elevation, partly in section of my improved implement; and Fig. 2 is a horizontal sectional view on the line 2—2 of Fig. 1.

This invention relates to that type of hole diggers which consists of an operating rod carrying a pair of oppositely disposed scoop-like blades having their lower ends curved inwardly toward each other, whereby pressure on the rod and rotation of the implement will cause the scoops to enter the earth and cut out a core of earth, which core will rest within the scoops and may be lifted out of the hole and dumped or knocked from between the scoops.

The object of the present improvement is to adapt this type of digger to removing a rock that may be encountered in digging the hole, and also to render the blades easier to clean or scrape when working in sticky earth, as more fully hereinafter set forth.

The letter $a$ designates the operating rod which may be solid or hollow and which is flattened at its lower end at $b$. Inclosing the lower end of this rod is a casing $c$. The scoops or shovels $d$ are the usual shape and are provided with the usual shanks $e$ which are flattened and bent inwardly so as to extend into the casing and overlap at opposite sides the flattened lower end of the operating rod. Extending through the overlapped ends of the shanks and the intermediate part $b$ of the operating rod is a horizontal bolt $f$ provided at one end with a nut. This bolt extends also through the side walls of the casing, and by screwing the nut up tightly all the parts will be clamped tightly together against movement. The walls of the casing are vertically slotted at $h$ where the bolt $f$ passes therethrough. The shanks of the scoops are horizontally slotted at $i$ and through these slots and the adjacent side walls of the casing extend the bolts $j$. The rod $a$ passes through a hole in the top end of the casing so as to hold the casing in an upright position.

In full lines in Fig. 1 the parts are shown in their usual position, in which position they would operate in the same manner as with the well known implement heretofore in use. In this position the nut $g$ is clamped tightly so as to prevent any pivotal movement of the parts. When however a rock is encountered which the scoops cannot embrace, the implement is withdrawn from the hole and the nut $g$ is loosened, whereupon the scoops will have a limited pivotal action on the bolts $j$, the slots $h$ permitting the bolt $f$ to move vertically sufficiently to permit this movement of the scoops. The implement is then reinserted in the hole and upon rotating it in the usual way the weight of the implement will cause the scoops to spread apart, as shown in dotted lines, whereupon the scoops will pass around the rock and thus get a sufficient hold upon it to permit it to be lifted out with the implement. With this device it will be seen also that it will be easier to scrape sticky earth from the scoops as by means of the pivotal arrangement of the scoops they may be spread apart to a convenient position for removing the sticky earth.

Having thus described my invention, what I claim as new and desire to secure by Letters Patent, is—

1. An implement of the class set forth, consisting of an operating rod, a pair of scoops having inwardly extending slotted shanks pivoted to the lower end of said rod, a vertically slotted casing or support, bolts passing through the casing and through the slots in said shanks, a clamp bolt connecting the operating rod with the shanks of the scoops and working through the vertical slots in the casing.

2. An implement for the purpose set forth, consisting of a casing or support, a pair of scoops having inwardly extending shanks, means for attaching said shanks to the casing or support, provision being made for a pivotal movement of the scoops inwardly and outwardly, an operating rod pivotally connected to the inner ends of said shanks, and means whereby said rod and said shanks are rigidly clamped to the casing or support at different points vertically on the casing or support.

In testimony whereof I hereunto affix my signature in the presence of two witnesses.

ALBERT SWENSON.

Witnesses:
GEO. H. WHITNEY,
HARRY W. LANNERS.

Copies of this patent may be obtained for five cents each, by addressing the "Commissioner of Patents, Washington, D. C."